United States Patent Office 3,003,050
Patented Oct. 3, 1961

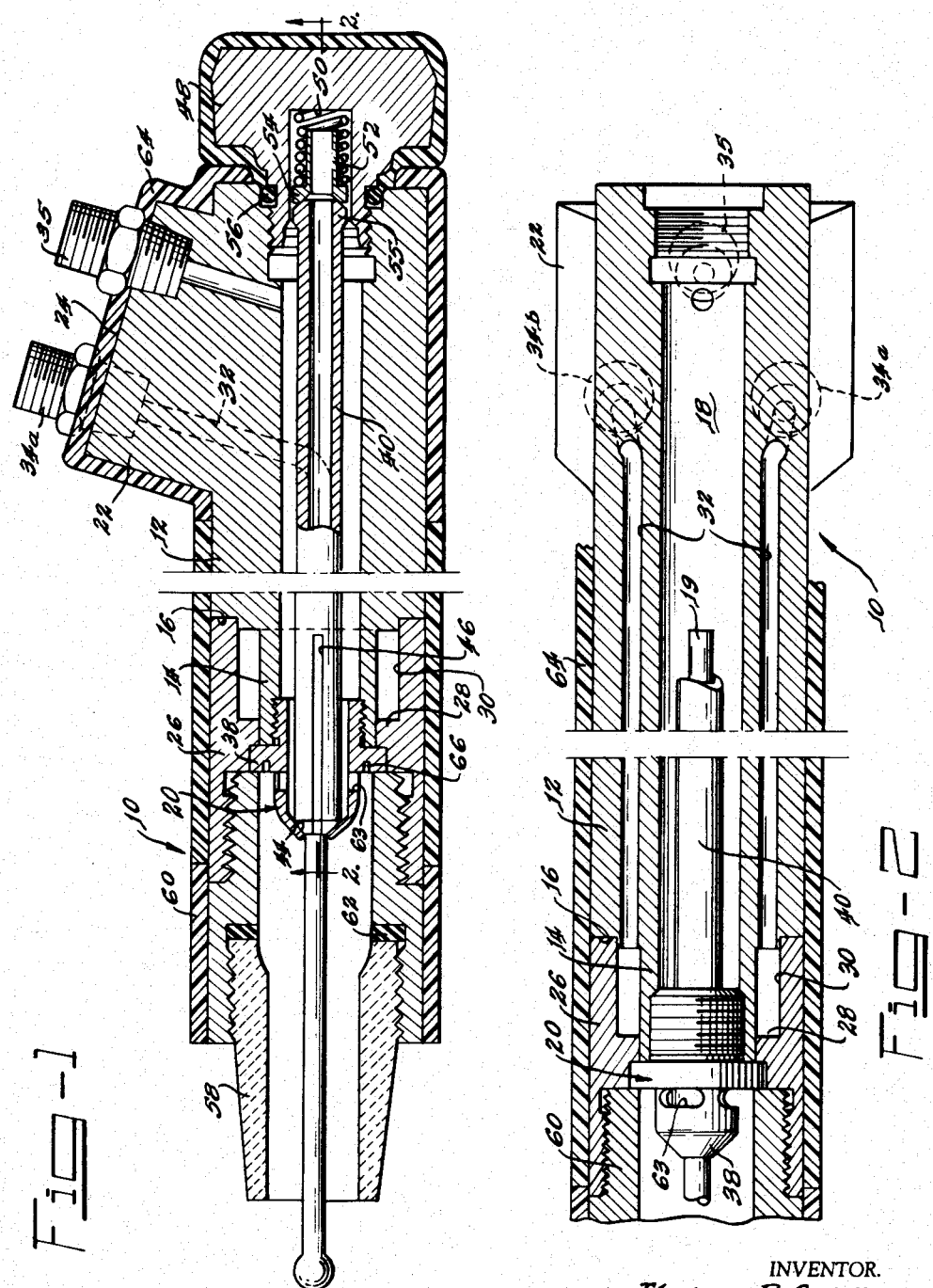

3,003,050
WELDING TORCH
Thomas B. Correy, Richland, Wash., assignor to the United States of America as represented by the United States Atomic Energy Commission
Filed June 8, 1960, Ser. No. 34,851
1 Claim. (Cl. 219—75)

This invention relates to an improved welding torch. More particularly this invention relates to a novel liquid-cooled, inert-gas shielding arc welding torch which is especially useful for making quality welds required for the closure of aluminum clad nuclear fuel elements.

It is an object of this invention to provide a welding tool which is adaptable for use in machine welding processes.

It is another object of this invention to provide a welding torch in which the inert shielding gas does not become contaminated with the liquid coolant.

It is another object of this invention to provide an inert-gas shielded welding torch in which the gas flows to the workpiece with a minimum of turbulence and cavitation.

It is also an object of this invention to provide a welding torch in which the electrode may be readily removed and replaced as the size of the work dictates.

Other objects and advantages of this invention will be readily recognized from the description of a preferred embodiment shown in the accompanying drawings in which:

FIGURE 1 is a longitudinal section of a welding torch embodying the present invention; and FIGURE 2 is a longitudinal section of the welding torch taken along the line 2—2 of FIGURE 1.

A welding torch 10 has a body 12 which is substantially circularly-cylindrical in shape. At one end of the body 12 is a reduced diameter end portion 14 and a shoulder 16 is formed on the inner face between the smaller diameter end portion 14 and the larger diameter main portion of the body 12. A circular passage 18 extends centrally through the body 12 within which is disposed an electrode 19 and a collet type clamping assembly 20 to be described in detail hereinafter. The body 12 has a protrusion 22 extending from its side which terminates in a flat surface 24 of substantially square cross section.

A retainer ring 26 having an outer diameter equal to the larger diameter of the main portion of the body 12 and an inner diameter larger than the diameter of said reduced diameter end portion 14 surrounds the body at the end portion of 14 abutting the body 12 at the shoulder 16. The retainer ring 26 also has an inwardly extending annular flange 28 which abuts the body 12 at the extreme end of the body. The retainer ring is sealed to the body 12 at the shoulder 16 and at the reduced end portion 14 to form a water tight annulus therebetween. Both the body 12 and the retainer ring 26 are fabricated of an electrically-conductive, corrosion-resistant material such as the alloy "Everdur" which comprises 94 to 96% copper, 3 to 4% silicon, and 1 to 1.2% manganese. The seals between the body and the retainer ring are also corrosion-resistant and are formed by melting in a hydrogen furnace preformed silver solder rings which are properly placed during assembly of the welding torch.

A pair of channels 32 extend longitudinally through the body 12 and provides communication between the annulus 30 and a pair of fittings 34a and 34b threadedly engaging the body 12 at the flat surface 24 of the protrusion 22 for the flow of coolant water. The fitting 34a is adapted to be connected by means of flexible piping means, to a water source (not shown). The fitting 34b is adapted to be connected by flexible pipe means, to a water drain; however, it is also adapted to serve as the electric power input to the welding torch. A third fitting 35 also engages the body 12 at the surface 34 and is connected directly to the passage 18. The fitting 35 is adapted to be connected through flexible pipe means to an inert-gas supply (not shown).

The collet type clamping assembly 20 comprises a collet head 38 and an elongated collet sleeve 40 within which the electrode 19 is clamped. The collet head 38 threadedly engages the inner diameter of the body 12 at its reduced end portion 14 and has an inner conical surface 44. The sleeve 40 extends substantially the length of the body 12 and has slots 46 at its one end so that when axially directed pressure is applied to the other end of the sleeve 40, the slotted end of the sleeve 40 cooperates with the conical surface 44 in the collet head 38 to clamp the electrode 19. Pressure is applied to the other end of the sleeve 40 by means of a cap 48 which threadedly engages the body 12. The cap 48 has a recess 50 which confronts the passage 18 when the cap is in place. Within the recess 50 is a spiral spring 52 within which fits a flanged fitting 54 which is adapted to engage the knobbed end 55 of the collet sleeve 40. An O-ring 56 is provided around the cap 48 to prevent the leakage of gas from the passage 18.

Surrounding a portion of the electrode 19 which extends from the end of the body 12 is a nozzle 58 and an extension ring 60. The extension ring 60 threadedly engages the inner diameter of retainer ring 26 at one end and is adapted to receive the nozzle 58 in threaded engagement at the other end. The nozzle 58 is fabricated of a ceramic material and, hence, a rubber washer 62 is provided between the nozzle 58 and extension ring 60 for protection against mechanical damage. It is to be noted that the nozzle and extension ring are removable from the welding torch and that the nozzle 58 may be threaded directly into the retainer ring 26, if so desired.

The inert gas within the passage 18 in the body 12 is passed to the interior of the extension ring 60 and nozzle 58 through three equispaced radial holes 63 in the collet head 38. The cross sections in the nozzle are selected to promote a fast laminar gas flow with a minimum of turbulence and cavitation.

An insulating coating 64 covers substantially all of the welding torch. The portion of the body containing the protrusion 22 is coated with an insulating lacquer which may be applied by spraying or dipping. The circularly-cylindrical portion of the body 12 is covered by a sleeve of insulating material such as nylon to prevent damage to the insulation from supporting clamps.

The electrode 19 is readily replaceable in the welding tool as is the collet type clamping assembly 20 which may be changed if a different size electrode is desired. When the cap 48 is unscrewed from the body 12 the slotted end of the collet sleeve 40 releases the electrode 19 so that it may be removed from the nozzle end of the torch. If it is desired to use a different size electrode the nozzle 58 and extension ring 60 may be removed and the collet head 38 unscrewed by means of a specially adapted tool having lugs to engage the holes 66 in the collet head. The collet sleeve 40 is readily removable from the capped end of the torch.

As may be seen in the construction of the described embodiment, the passages for the water coolant and the inert shielding gas are completely separated from each other within the torch. This is desirable, especially in the fabrication of aluminum clad nuclear fuel elements because water mixing with the inert gas would disassociate in the presence of the arc. The hydrogen released thereby would penetrate the aluminum cladding material and prevent proper bonding of the fuel elements.

While a preferred embodiment of the invention has been described hereinbefore, it is readily apparent that many modifications may be made thereto while remaining within the scope of the invention. It is, therefore, the intention of the inventor to be limited only by the scope of the appended claim.

What is claimed is:

A welding torch comprising an electrically-conducting, substantially-circularly-cylindrical body having an axially aligned circular passage therethrough, said body having a reduced diameter portion at one end forming a shoulder, a retainer ring having an outer diameter equal to said body and an inner diameter greater than the diameter of said end portion, said retainer ring having one end in abutment with and sealed to said shoulder, an inwardly extending flange centrally located within said retainer ring in abutment with and sealed to said body at its reduced diameter portion to form a sealed annular space between said retainer ring and said body, an electrode longitudinally disposed within said passage and extending beyond said reduced diameter end portion of said body, a collet sleeve surrounding the portion of said electrode within said passage and extending to the other end of said body, said collet sleeve having longitudinal slots at one end, a collet head having a conical inner surface in contact with the slotted end of said collet sleeve and threadingly engaging the inner diameter of said body at its reduced diameter end, said collet head having an outwardly extending flange in abutment with the end of said body and said inwardly extending flange of said retainer ring, a cap threadedly engaging said body at its other end and having a recess therein to receive said other end of said collet sleeve, spring means disposed within said recess to constrain said collet sleeve towards said collet head thereby causing said slotted end of said collet sleeve in cooperation with the conical inner surface in said collet head, to clamp said electrode, an extension ring threadedly engaging the inner diameter of the other end of said retainer ring and engaging the collet head so as to keep it in threaded engagement with the body, a ceramic nozzle threadedly engaging the inner diameter of said extension ring at one end and terminating at its other end adjacent the end of said electrode, means for introducing an inert gas into said passage in the body, said collet head having three equispaced radial holes for providing communication for said inert gas from said passage to said nozzle, the body having a pair of coolant channels passing longitudinally through said body and connecting to said annulus between the retainer ring and body, means for connecting one of said coolant channels to a liquid coolant source and the other coolant channel to a coolant drain, said connecting means also adapted to connect to an electric power source, and an insulating coating surrounding said body retainer ring and extension ring.

References Cited in the file of this patent

UNITED STATES PATENTS

| | | |
|---|---|---|
| 2,784,294 | Gravert | Mar. 5, 1957 |
| 2,794,898 | Gibson | June 4, 1957 |
| 2,858,412 | Kane et al. | Oct. 28, 1958 |
| 2,876,329 | Stanchus | Mar. 3, 1959 |
| 2,938,106 | Hawthorne | May 24, 1960 |